(12) United States Patent
Motoya et al.

(10) Patent No.: US 8,737,773 B2
(45) Date of Patent: May 27, 2014

(54) OPTICAL CONTROL ELEMENT

(75) Inventors: Masayuki Motoya, Chiyoda-ku (JP);
Junichiro Ichikawa, Chiyoda-ku (JP);
Hiroshi Murata, Takarazuka (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 180 days.

(21) Appl. No.: 13/415,032

(22) Filed: Mar. 8, 2012

(65) Prior Publication Data
US 2012/0230627 A1 Sep. 13, 2012

(30) Foreign Application Priority Data

Mar. 8, 2011 (JP) ................................ 2011-049853
Sep. 12, 2011 (JP) ................................ 2011-198114

(51) Int. Cl.
| | |
|---|---|
| G02F 1/035 | (2006.01) |
| G02F 1/225 | (2006.01) |
| G02F 1/01 | (2006.01) |
| G02F 1/03 | (2006.01) |
| G02F 1/21 | (2006.01) |

(52) U.S. Cl.
CPC .............. *G02F 1/2255* (2013.01); *G02F 1/225* (2013.01); *G02F 1/0316* (2013.01); *G02F 2001/212* (2013.01)
USPC .................................................. 385/3; 385/2

(58) Field of Classification Search
USPC ......................................................... 385/2, 3
See application file for complete search history.

(56) References Cited

U.S. PATENT DOCUMENTS

| | | | | |
|---|---|---|---|---|
| 7,130,493 | B2 * | 10/2006 | Heaton et al. ...................... | 385/3 |
| 8,280,201 | B2 * | 10/2012 | Prosyk ................. | 385/3 |
| 2010/0232736 | A1 | 9/2010 | Ichikawa et al. | |
| 2011/0135242 | A1 * | 6/2011 | Prosyk ............................... | 385/3 |
| 2012/0230627 | A1 * | 9/2012 | Motoya et al. ...................... | 385/3 |
| 2012/0251032 | A1 * | 10/2012 | Kato ................................ | 385/3 |

FOREIGN PATENT DOCUMENTS

| | | |
|---|---|---|
| JP | 7-87029 A | 3/1995 |
| WO | 00/50952 A1 | 8/2000 |
| WO | 2007/114367 A1 | 11/2007 |

OTHER PUBLICATIONS

"High-Speed Optical Modulator in LiNbO3 With Cascaded Resonant-type Electrodes," Rodger Kraehenbuehl, James H. Cole, Robert P. Moeller, and Marta M. Howerton, Journal of Lightwave Technology, vol. 24, Issue 5, pp. 2184-2189 (2006).*

(Continued)

*Primary Examiner* — Rhonda Peace
(74) *Attorney, Agent, or Firm* — Taft, Stettinius & Hollister LLP

(57) ABSTRACT

An optical control element having a substrate 1 having an electro-optic effect, an optical waveguide 2 formed on the substrate, and a control electrode 3 that is provided on the substrate and controls the phase of light that propagates through the optical waveguide, in which the control electrode 3 has a plurality of resonant-type electrodes 31 and 32 that are disposed along the optical waveguide 2 and have different resonance frequencies ($f1$ and $f2$), an feeder electrode 30 through which control signals are input and branched signal electrodes that are branched from the feeder electrode are connected to the respective resonant-type electrodes, and the branched signal electrode is configured to match a timing at which the electric control signal is applied to each of the resonant-type electrodes and a timing at which the light that propagates through the optical waveguide passes at the section of each of the resonant-type electrodes.

15 Claims, 5 Drawing Sheets

(56) References Cited

OTHER PUBLICATIONS

"A 10-GHz Resonant-Type LiNbO3 Optical Modulator Array," Satoshi Shinada, Tetsuya Kawanishi, Takahide Sakamoto, Masahiro Andachi, Kenji Nishikawa, Satoru Kurokawa, and Masayuki Izutsu, IEEE Photonics Technology Letters, vol. 19, Issue 10, pp. 735-737 (2007).*

"A Novel Z-cut LiNbO3 Mach-Zehnder Modulator Using Resonant CPW Electrodes with Single Driving Signal for Zero-Chirp Operation," M. Motoya, J. Ichikawa, H. Murata, and Y. Okamura, Optical Society of America, 2011 Conference on Lasers and Electro-Optics (CLEO), pp. 1-2 (2011).*

Krahenbuhl, R., et al., "High-Speed Optical Modulator in LiNbO3 with Cascaded Resonant-Type Electrodes," Journal of Lightwave Technology, vol. 24, No. 5, May 2006, pp. 2184-2189.

Shinada, S., et al., "A Resonant Type LiNbO3 Optical Modulator Array with Micro-Strip Antennas," Institute of Electronics, Information and Communication Engineers Transactions on Electronics, vol. E90-C, No. 5, May 2007, pp. 1090-1095.

Nakasuga, Y., "Fiber Optic Microwave Transmission Links Using Cascaded External Optical Modulators," Technical Report of Proceedings of Institute of Electronics, Information and Communication Engineers, OQE 93-86, 1993-09, pp. 25-31.

Kikushima, K., et al., "Modulation Properties of an Optical Modulator that Uses Cascade Modulation Scheme for Multi-Channel Signal Modulation," Journal of Institute of Electronics, Information and Communication Engineers, vol. J90-C, No. 4, 2007/4, pp. 328-343.

* cited by examiner

OPTICAL CONTROL ELEMENT

The present disclosure contains subject matter related to that disclosed in, and priority is claimed to, Japanese Priority Patent Application JP 2011-049853 filed in the Japan Patent Office on Mar. 8, 2011 and Japanese Priority Patent Application JP 2011-198114 filed in the Japan Patent Office on Sep. 12, 2011, the entire contents of which are hereby incorporated by reference.

TECHNICAL FIELD

The present invention relates to an optical control element, and particularly to an optical control element having resonant-type electrodes that modulate light waves that propagate through an optical waveguide.

BACKGROUND ART

An optical control element, such as an optical modulator, is an essential device in optical communication systems, optical measurement equipment, and optical signal processing. In the conventional long-haul optical communications, the baseband transmission systems were mainly used, broadband operations of optical modulators are required.
In current systems, an optical modulator having an optical waveguide for confining and controlling propagating light and a traveling wave-type electrode for applying modulation signals (electric signals) on a lithium niobate ($LiNbO_3$) substrate is mainly used.

On the other hand, in an optical modulator with resonant-type electrodes, a resonant standing wave of the electric signal is generated in the electrode, when electric signal is fed at a specific frequency. Since a resonant type optical modulator is based on the resonance of the electric signal as mentioned above, it operates efficiently especially when electric signal of the specific frequency is fed. The modulation efficiency per unit length of the electrode is better than in the traveling wave-type optical modulator. However, since a resonant-type modulator is a band operation modulator that operates only in a specific band, the modulator is not used in baseband transmutation systems, is used as optical modulator for an optical clock generators, optical broadcasting systems, and the like.

In next-generation optical communication systems, an optical modulator that can operate at extremely high speeds more than 40 Gbps, is required; however, in such a high frequency range, signal losses increase on a traveling electrode is a defect. Therefore, so-called resonant-type electrode on which resonant standing waves are induced appears promising electrode.

In addition, optical modulators having a plurality of resonant-type electrodes placed along an optical waveguide have been also proposed. As examples of these modulators, optical modulators having resonant-type electrodes of same resonant frequency are placed as shown in Patent Document 1 and Non Patent Documents 1 and 2, and a transmitting system of multiple signals of CATV, satellite broadcasting by modulating separately using cascaded external modulators located in series (generally called "cascaded integration") as shown in Patent Document 2 and Non Patent Documents 3 and 4, have proposed.

However, when a plurality of optical modulating sections is used to compose an optical control device, such as an optical modulator, it is necessary to apply the modulation signals corresponding to the respective modulating sections, and there is a problem in that a modulation signal generator circuit for the operation becomes intricate. Furthermore, in order to generate a proper modulated light signal, it is necessary to adjust a modulation timing between electric signal and propagating light through each of the modulating sections, and therefore means for adjusting the timing of the modulation signal applied to each modulating sections are required, and there is a problem in that an entire apparatus including the optical modulator becomes complicated, and the costs are increased.

RELATED ART DOCUMENT

Patent Document

[Patent Document 1] International Publication No. WO2000/050952
[Patent Document 2] JP-A-7-87029
[Patent Document 3] International Publication No. WO2007/114367

Non Patent Document

[Non Patent Document 1] "High-Speed Optical Modulator in $LiNbO_3$ With Cascaded Resonant-Type Electrodes", Roger Kraehenbuehl, James H. Cole, Robert P. Moeller, and Marta M. Howerton, Journal of Lightwave Technology, Vol. 24, Issue 5, pp. 2184—(2006)
[Non Patent Document 2] "A Resonant Type $LiNbO_3$ Optical Modulator Array with Micro-Strip Antennas", Satoshi SHINADA, Tetsuya KAWANISHI, and Masayuki IZUTSU, IEICE TRANS, ELECTRON., VOL. E90-C, NO. 5 May 2007
[Non Patent Document 3] "Studies of transmitting microwaves using a cascaded connection-type external optical modulator," Nakasuga Yoshinori, Koji Horikawa, and Hiroyo Ogawa in Technical Research Report of The Institute of Electronic, Information and Communication Engineers, OQE Light and Quantum Electronics 93 (237), 25-31 (1993)
[Non Patent Document 4] "The multichannel signal modulation characteristics of an optical modulator by cascaded modulation," Koji Kikushima and Toshihisa Fujiwara, IEICE TRANS, ELECTRON., VOL. J90-C NO. 4 pp. 328-343 (2007)

DISCLOSURE OF THE INVENTION

Problem that the Invention is to Solve

An object of the invention is to solve the above problems and to provide an optical control device in which a plurality of resonant-type electrodes having different resonant frequencies are used, the modulation efficiency is high, and the costs can be reduced.

Means to Solve the Problem

In order to solve the problem, a first aspect of the invention is an optical control element having a substrate having an electro-optic effect, an optical waveguide formed on the substrate, and a control electrode that is provided on the substrate and controls phase of light that propagates through the optical waveguide, in which the control electrode has a plurality of resonant-type electrodes that are disposed along the optical waveguide and have different resonant frequencies, a feeder electrode through which control signals are input and branched signal electrodes that are branched from the feeder electrode are connected to the respective resonant-type electrodes, and the branched signal electrode is configured to match a timing at which the electric control signal is applied to each of the resonant-type electrodes and a timing at which the light that propagates through the optical waveguide passes at the section of each of the resonant-type electrodes.

A second aspect of the invention is the optical control element according to the first aspect, in which the resonant frequency is set to an approximately odd harmonic of the fundamental frequency of the rectangular wave electric signal for control.

A third aspect of the invention is the optical control element according to the first aspect, in which the resonant frequencies are set to become a specific frequency f and frequencies f±Δf that are different by a predetermined amount Δf from the specific frequency, and control signals having a single frequency or a plurality of different frequencies are used as the control signal.

A fourth aspect of the invention is the optical control element according to any one of the first to third aspects, in which the resonant-type electrodes disposed along the optical waveguide are disposed in the light propagation direction in the order of the magnitudes of the modulation depths by the respective resonant-type electrodes with respect to the light that propagates through the optical waveguide.

A fifth aspect of the invention is the optical control element according to any one of the first to fourth aspects, in which the control electrode has a traveling wave-type electrode, and the traveling wave-type electrode is applied with the control signals branched from the feeder electrode.

A sixth aspect of the invention is the optical control element according to any one of the first to fifth aspects, in which the optical waveguide on which the control electrode is placed is a straight optical waveguide or Mach-Zehnder-type optical waveguide.

Advantage of the Invention

According to the first aspect of the invention, since, in the optical control element having a substrate having an electro-optic effect, an optical waveguide formed on the substrate, and a control electrode that is provided on the substrate and controls phase of light that propagates through the optical waveguide, the control electrode has a plurality of resonant-type electrodes that are disposed along the optical waveguide and has different resonance frequencies, a feeder electrode through which control signals are input and branched signal electrode that are branched from the feeder electrode are connected to the respective resonant-type electrodes, and the branched signal electrode is configured to match a timing at which each of the control signals is applied to each of the resonant-type electrodes and a timing at which the light that propagates through the optical waveguide passes at the section of each of the resonant-type electrodes, it is not necessary to provide modulation signal circuits that correspond to the respective resonant-type electrodes, and, furthermore, it also becomes unnecessary to individually provide means for adjusting timings at which modulation signals are input to the respective resonant-type electrodes. Therefore, it becomes possible to provide an optical control element in which resonant-type electrodes are used, the modulation efficiency is high, and the costs can be decreased.

According to the second aspect of the invention, since the control signal is a rectangular wave, and the resonant frequency is set to an approximately odd harmonics of the fundamental frequency of the rectangular wave, the respective resonant-type electrodes become capable of carrying out modulation in accordance with frequency components necessary when the rectangular wave is expanded in the Fourier series, and therefore it becomes possible to more accurately replicate optical modulation operations that correspond to the control signals of the rectangular wave.

According to the third aspect of the invention, since the resonant frequencies are set to become a specific frequency f and frequencies f±Δf that are different by a predetermined amount Δf from the specific frequency, and control signals having a single frequency or a plurality of different frequencies are used as the control signal, it is possible to obtain modulation frequency characteristics in which the peak appears at the specific frequency f, and the predetermined amount Δf is approximately the full width at half maximum.

According to the fourth aspect of the invention, since the resonant-type electrodes disposed along the optical waveguide are disposed in the light propagation direction in the order of the magnitudes of the modulation depths by the respective resonant-type electrodes with respect to the light that propagates through the optical waveguide, modulation operations that correspond to necessary modulation depths can be realized, and it becomes possible to more accurately replicate optical modulation operations that correspond to the control signals.

According to the fifth aspect of the invention, since the control electrode has a traveling wave-type electrode, and the traveling wave-type electrode is applied with the control signals branched from the feeder electrode, it becomes possible to have optical modulation by the resonant-type electrode and optical modulation by the traveling wave-type electrode in a mixed state, and it becomes possible to provide an optical control element having better functionality. For example, at frequencies at which a sufficient modulation depth cannot be obtained by the traveling wave-type electrode, light waves are modulated using the resonant-type electrodes, and it also becomes possible to expand the modulation band.

According to the sixth aspect of the invention, since the optical waveguide on which the control electrode is placed is a straight optical waveguide or Mach-Zehnder-type optical waveguide, it becomes possible to carry out a variety of optical modulations on light waves that propagate through the optical waveguide.

BEST MODE FOR CARRYING OUT THE INVENTION

Hereinafter, the optical control element of the invention will be described in detail.

Figure 1:
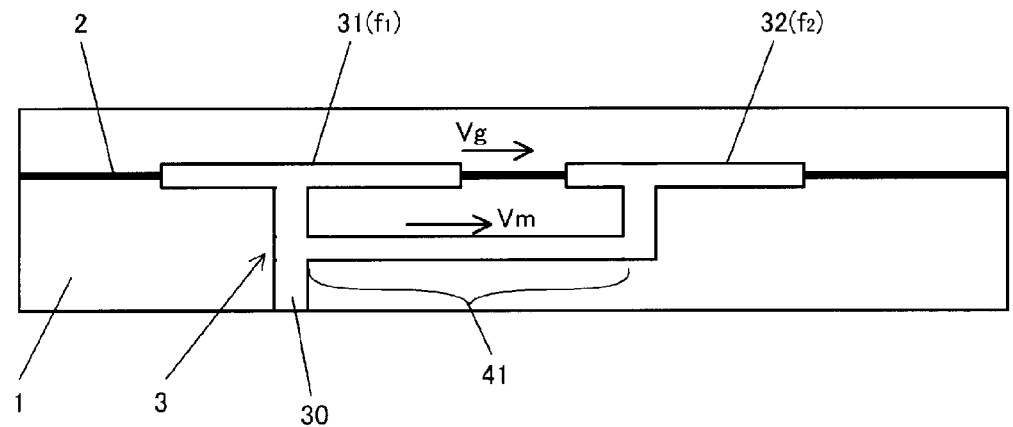
FIG. 1 is a view explaining a first example according to the optical control element of the invention.

As shown in FIG. 1, the optical control element of the invention has a substrate 1 having an electro-optic effect, an optical waveguide 2 formed on the substrate, and a control electrode 3 that is provided on the substrate and controls the phase of light that propagates through the optical waveguide, in which the control electrode 3 has a plurality of resonant-type electrodes 31 and 32 that is disposed along the optical waveguide 2 and has different resonance frequencies (f1 and f2), an feeder electrode 30 through which control signals are input and branched signal lines that are branched from the feeder electrode are connected to the respective resonant-type electrodes, and the branched signal electrode is configured to match a timing at which the control signal is applied to each of the resonant-type electrodes and a timing at which the light that propagates through the optical waveguide passes through the vicinity of each of the resonant-type electrodes.

Examples of the substrate 1 having an electro-optic effect that can be used include lithium niobate, lithium tantalate, polarized lead zirconium titanate (PLZT), quartz-based materials, and combinations thereof. Particularly, lithium niobate (LN) or lithium tantalate (LT) crystals having a high electro-optic effect are preferably used. In the optical control element of the invention, since the most effective modulation can be expected in a configuration in which resonant-type electrodes are disposed along an optical waveguide as shown in FIG. 1, a Z cut-type substrate is preferred.

The optical waveguide 2 can be formed by a method in which a ridge structure is formed on the substrate, a method in which the refractive index of a part of the substrate is adjusted, or a method in which both of the methods are combined. In a ridge-type optical waveguide, the substrate is mechanically cut or chemically etched so as to leave substrate portions that become the optical waveguide and remove the other portions. In addition, it is also possible to form grooves on both sides of the optical waveguide. In a method in which the refractive index is adjusted, the substrate is configured to have a refractive index higher than the refractive index of the substrate itself at a part of the substrate surface that corresponds to the optical waveguide by thermally diffusing Ti or the like, or using the proton-exchange method or the like.

The control electrode 3 is constituted by signal electrodes, such as the resonant-type electrodes (31 and 32), or a feeder (a line that applied control signals to the resonant-type electrodes), a ground electrode (not shown), and the like. The control electrode can be formed by, a metal plating method, and the like. In addition, according to necessity, the respective electrodes are placed on a buffer layer, such as a $SiO_2$ film, between the electrodes and the substrate. The buffer layer has an effect of preventing light that propagate through the optical waveguide from being absorbed or scattered by the control electrode. In addition, it is also possible for the buffer layer to further include a Si film or the like, according to necessity, in order to alleviate the pyroelectric effect of a thin plate.

The resonant-type electrode that is used in the optical control element of the invention has a length, a form and the like that are set to have predetermined resonance frequencies (f1 and f2). It is needless to say that a variety of combinations, such as a "both end open type" in which both ends of the signal electrode are opened from the ground electrode, a "both end short circuit type" in which both ends of the signal electrode are all short circuited to the ground electrode, and, furthermore, a "open and short circuit type" in which one end is short circuited to the ground electrode, and the other is opened from the ground electrode, are available as the form of the resonant-type electrode. In addition, a ring-type resonator may be used. However, from the viewpoint of maintaining phase continuity of the modulated optical signal on each frequency, the velocity of microwaves in the ring-type resonant electrode section is desirably equal to or closer to the velocity of light that propagates through the waveguide.

In the optical control element of the invention, the plurality of resonant-type electrodes (31 and 32) having different resonance frequencies is used. In a method for inputting control signals to the resonant-type electrodes, an feeder electrode 30 is used to supply control signals. It is also possible to carry out optical modulation by separating the control signal into signals composed of components of modulation frequencies f1 and f2 using a filter or the like, and supplying the signals to the resonant-type electrodes (31 and 32) for which the resonance frequencies are f1 and f2 respectively. In order to simplify the configuration, the control signals are supplied to the respective resonant-type electrodes using a divider in which the feeder is branched as shown in FIG. 1.

In the optical control element of the invention, furthermore, branched signal electrodes that are branched from the feeder electrode 30 and connected to the respective resonant-type electrodes (31 and 32) is configured so as to match a timing at which the control signal is supplied to each of the resonant-type electrodes and a timing at which the light that propagates through the optical waveguide 2 passes through the section of each of the resonant-type electrodes. Specifically, the branched signal electrode is provided with an electric delay line 41 as shown in FIG. 1.

Meanwhile, in the invention, the "timing at which the light that propagates through the optical waveguide passes through the section of the resonant-type electrode" refers to a timing at which the phase of light that propagates through the optical waveguide is controlled by an electric field generated by the resonant-type electrodes due to the control signals applied to the resonant-type electrodes.

The electric delay line 41 is provided to compensate for a time during which light waves propagate through the optical waveguide between the resonant-type electrodes (light delay time). For example, when the distance between both electrodes is set to approximately 10 mm, the light delay time is in the order of several tens of ps, and the light delay time does not become a problem in low-speed modulation such as 1 GHz or less. However, in high-speed modulation of more than 40 GHz, it is necessary to accurately compensate for the light delay time.

In a case in which the velocity Vm of the control signal that travels through the electric delay line is perfectly matched with the velocity Vg of the light waves that travel through the optical waveguide, the light delay time can be compensated for by disposing the electric delay line 41 in parallel with the optical waveguide 2 as shown in FIG. 1. That is, while a delay is caused at a time at which an input signal arrives at the respective resonant-type electrodes, since the electric delay time and the light delay time are matched with each other, no trouble is caused in the optical modulation characteristics by the light delay time. In addition, since the velocities at each frequency of a signal that travels through a normal signal line are almost same, it is also not necessary to provide a special circuit for each frequency.

Furthermore, since the length of the electric delay line can be arbitrarily set according to the optical waveguide, the flexibility of design is large. The electric delay line can also be applied to a plurality of resonant-type electrodes by further extending the electric delay line along the optical waveguide. The electric delay line can be jointly used with the traveling wave-type electrode.

A wiring for adjusting the propagating times between light signal and the control signal will be described in more detail. In a case in which a plurality of electrodes is disposed almost parallel to an almost optical straight waveguide as shown in FIG. 1, it is possible to roughly match the timings by almost equalizing the velocity of the control signal that propagates through the wiring and the velocity of light that propagates through the optical waveguide (equivalent to matching the group refractive index of the wiring section with respect to microwaves and the group refractive index of the optical waveguide with respect to light).

At this time, the wiring has lengths of the respective sections and a velocity of the control signal which are designed in consideration of a change in the phase of the control signal branched at the branching section of the wiring, the length of a wiring at the feeding section, the location of the feeding section for the resonant electrodes, and the like so that the timings of arrival times match with each other.

In a configuration in which a ferroelectric material, such as lithium niobate, is used as the substrate, it is known that the velocity of microwaves and the velocity of propagating light can be matched with each other by use of a buffer layer having a low permittivity, such as $SiO_2$, applying of a coplanar-type electrode having a high aspect ratio, applying of a thin substrate, and the like.

The velocity can also be adjusted by using a build-up wiring, a flip chip bonding, or an air bridge electrode. Furthermore, in a case in which a substrate having the configuration as shown in Patent Document 3 (a configuration in which electrodes are disposed on both surfaces of a thin substrate) is used, the wiring section can have a variety of configurations. For example, for the above substrate configuration, it is possible to use any of a G-CPW (a configuration in which a coplanar-type line is formed of a signal line and ground electrodes that sandwich the signal line on the surface of a substrate, and the ground electrodes are disposed on the rear surface on the opposite side), a CPW (a configuration in which a coplanar-type line is disposed only on the rear surface of a substrate), a CPS (coplanar strip line), a micro strip line, and combinations thereof as the structure of wiring electrodes that mutually connect the resonant-type electrodes that are continuously disposed (in a series shape).

A configuration in which the line impedance is not changed thorough the wiring section is desirable, and, in a configuration (attached (ridge) waveguide substrate) in which a reinforcing plate is attached to a thin substrate, and, furthermore, a ridge-type waveguide is formed on the thin plate as shown in Patent Document 3, the flexibility of design of practical electrodes is extremely high, and the velocity matching between the propagation velocity of light and the propagation velocity of the control signal is easily realized.

In a case in which a G-CPW electrode, a CPS electrode, a CPW electrode, and a micro strip line electrode are formed on the attached (ridge) waveguide substrate using a wiring electrode having the same width and height, the refractive indices (the refractive indices microwaves) of electric signals (control signals) are as follows.
$1.5 <$ the refractive index of the CPW$<$ the refractive index of the G-CPW (approximately 2)$<$ the refractive index of the micro strip line$<5$.

In summary, the micro strip line electrode can be used for the wiring section for which a large delay amount is required, and the CPW electrode can be used for the wiring section for which a precedence amount is required. Here, the widths or heights of the wirings are not specified across the entire wirings section, and may be appropriately changed; however, with regard to the heights of the wirings, the same height is desirable so that the wirings can be formed by a single process from the viewpoint of the costs of the manufacturing process.

In the case of the configuration of the invention, even when the height is specified, adjustment of the delay or precedence amount of the control signal and adjustment of the impedance can be appropriately carried out by designing gap distances between the center electrodes of the G-CPW or the CPW and ground electrodes of them, by providing or not providing of buried electrode, by designing the width of wiring line patterns. Generally, for the translation wirings between the CPW electrode, the G-CPW, or the micro strip line on a wiring substrate of the related art, locations (height) through which the microwaves propagate on them are significantly different, therefore the losses caused by translation connection are large. Therefore, there is no case in which the above wirings are used at the same time. That is, there are some cases in the related art in which the above wirings are used in parallel on the same substrate as separate series of signal lines, but there is no case in which the above wirings are mutually and directly connected as the same wiring on the same substrate. In contrast to the above, low-loss connections of the CPW, the CPS, the G-CPW, and the micro strip line on the same substrate is a characteristic that is developed for the first time in an extremely thin (10 μm or less) wiring substrate that is configured as shown in Patent Document 3 and has a high permittivity (dielectric constant of 28 to 48), such as an LN substrate.

On the other hand, in a case in which a semiconductor is used as the substrate, speed adjustment of microwaves is enabled by meandering of the electrodes, multiple folding of the electrodes, segmentation of the electrode, placing of a high-permittivity material in the vicinity of the electrode, and the like. Needless to say, the velocity can also be adjusted by using a build up wiring, a flip chip bonding, or an air bridge electrode. In addition, in a case in which a polymer-based material is used for the substrate, the velocities of microwaves of light are almost matched in many wiring configurations, and it is possible to adjust the velocities of microwaves by the same method as a method in which the polymer-based material is used for a ferroelectric material or semiconductor.

In addition, while there is no limitation on the shape or principle of the branching section of wiring, it is important to carry out branching at a low loss. It is possible to modulate light more effectively, as a whole, in a configuration in which the branching ratio is changed for each frequency, and which electrodes corresponding to each frequency are provided. It is necessary to consider the amount of the phase changing of the control signal at the branching section when the micro-wave velocity and the length of the wiring are designed and formed.

Next, a section that carries out feeding to a resonant-type modulator will be described. In order to increase the feeding efficiency, it is desirable to achieve impedance matching between the wiring section and the resonant electrode. For such a purpose, an impedance conversion circuit may be used, or feeding may be carried out by appropriately providing a stab or the like so as to match the impedance. In addition, it is possible to achieve feeding electrical signal with impedance matching condition between the wirings and the resonant-type electrodes by adjusting the feeding point to the resonant-type electrodes.

The optical control device of the invention is designed as a combination modulator to achieve a synthesize a wide frequency band optical signal, by using in combination the resonant-type electrodes, having different characteristics of modulation frequency. According to the optical control device of the invention, it is possible to cascade a plurality of resonant-type electrodes having different resonance frequencies, and realize a low-power consumption digital-type modulator. Additionally, by the invention it becomes possible to use an optical modulator having a resonant-type electrode that operates with low energy-consumption for digital signals transmission and broadband baseband transmission, where an optical modulator having a traveling wave-type electrode configuration is used conventionally.

In the optical control device of the invention, it is possible to compensate the "degradation of optical modulation characteristics caused by a delay time difference," which is a problem of a "multiple cascaded electrode optical modulator" in which a number of control electrodes are placed along an optical waveguide. Additionally, in the invention, the number of applicable resonant-type electrodes is, in principle, not limited. Furthermore, it is possible to use with the techniques for the high-efficient optical modulators, such as push and pull driving, a ridge waveguide, or a thin plate waveguide.

In addition, the optical control device of the invention is extremely effective in realizing an ultrahigh-speed optical modulator over 40 Gbps in next-generation optical communication. Particularly, since it is possible to provide desired frequency characteristics by a configuration in which a plurality of resonant-type electrodes having different operation frequencies is cascaded, the application areas are significantly extended. Additionally, since it is possible to drive the respective resonant-type electrodes using a single signal without using special signal processing circuit, it is possible to realize a high-performance high-speed modulator having high modulation efficiency in a small size and at low costs.

Figure 2:
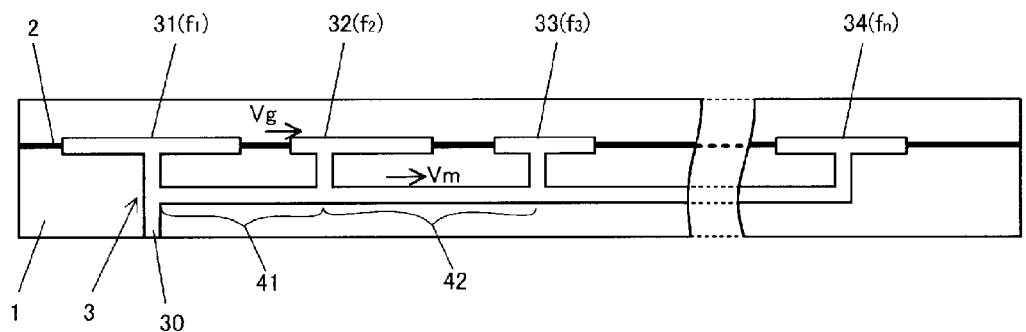
FIG. 2 is a view explaining a second example according to the optical control element of the invention.

Next, with regard to the optical control element of the invention, a variety of embodiments in which a number of resonant-type electrodes are used as shown in FIG. 2 will be described. Compared to FIG. 1, in FIG. 2, the resonant-type electrodes 31 to 34 have mutually different resonance frequencies (f1, f2, f3, and fn; n represents an arbitrary natural number). In addition, electric delay lines are provided between the respective resonant-type electrodes. For example, an electric delay line 41 is provided between the resonant-type electrodes 31 and 32, and, similarly, an electric delay line 42 is provided between the resonant-type electrodes 32 and 33.

It becomes possible to efficiently carry out optical modulation of digital signals or arbitrary wave-form signals that are composed of a plurality of frequency components by using the optical control element as shown in FIGS. 1 and 2. Hereinafter, a synthesize of optical modulation of an arbitrary wave form will be described using a rectangular wave as an example.

The following formula is a rectangular wave expanded in the Fourier series. In the case of a rectangular wave, it is possible to express the rectangular wave as a sum of frequency components that are odd harmonics. Even in the case of non-rectangular waves, it is possible to specify necessary resonance frequencies or modulation depths by expanding the waves in the Fourier series, and expressing the waves as a sum of the respective frequency components.

$$f \text{ rectangular wave}(t) = A/2[\sin(wt) + \tfrac{1}{3}\sin(3wt) + \tfrac{1}{5}\sin(5wt) + \tfrac{1}{7}\sin(7wt) + \ldots]$$ [Formula 1]

In this case, in the resonant-type electrode of FIG. 2, n electrodes are cascaded, which are set to the resonant-type electrode 31 of a rectangular wave fundamental frequency (f1), the resonant-type electrode 32 of a third harmonic frequency of the fundamental wave (f2), the resonant-type electrode 33 of a fifth harmonic frequency of the fundamental wave (f3), and the resonant-type electrode 34 of a (2n−1)th harmonic frequency of the fundamental wave (fn).

The modulation depths of the respective resonant-type electrodes are designed to be $\tfrac{1}{3}$, $\tfrac{1}{5}$, ..., $1/(2n-1)$ of the modulation depth of the fundamental frequency f1 respectively in accordance with the amounts of the respective frequency components when a perfect rectangular wave is expanded in the Fourier series. The modulation depth can be set by adjusting the branching ratio of control signal, the loss of wirings including the branched circuit or feeding section, and the modulation efficiencies of the respective electrode sections. In addition, since the control signal itself is a sum of a plurality of frequency components, only a frequency component that corresponds to the resonant frequency is applied to the respective resonant-type electrodes by applied control signal only to the respective resonant-type electrodes, and therefore the modulation depth is also automatically set.

Figure 3:
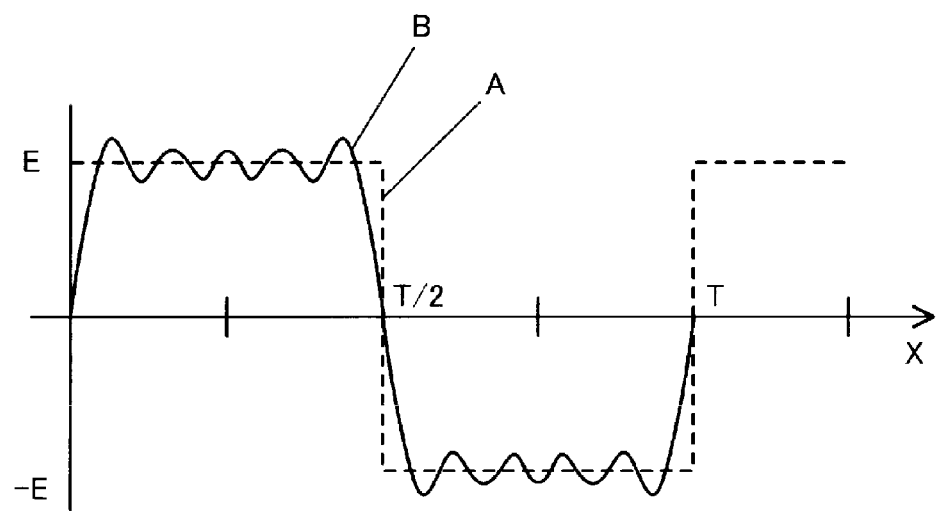
FIG. 3 is a view explaining a modulation state in a case in which a rectangular wave is used as a control signal in the second example.

FIG. 3 shows a graph B of a simulation result of a case in which a control signal of a rectangular wave A is input to the optical control element, and, consequently, the phase of light waves that propagate through the optical waveguide is controlled when five resonant-type electrodes (n=5) of FIG. 2 are provided. In the cascaded resonant-type electrodes, the rise and fall of the rectangular wave can be set faster by adding the optical modulations of high frequency components, and can be closer to the shape of a rectangular wave.

In long-haul optical fiber communication, it is common to use a rectangular wave by binary signals. However if the rectangular wave is not a perfect rectangular wave, whose waveforms has somewhat tailored edges as shown in the graph B of FIG. 3, practical optical signal transmission is still possible. Here, the characteristics in a case in which five resonant-type electrodes are provided, and frequencies that are up to ninth harmonic of the fundamental wave are modulated are shown; however, in actual transmission, wave forms of optical signals having practically sufficient characteristics can be obtained even in a configuration in which three (or two) resonant-type electrodes are provided, and frequencies that are up to fifth (or third) harmonic of the fundamental frequency are modulated.

As described above, since the control signal is a rectangular wave, and the resonant frequency is set to approximately an odd harmonic of the fundamental frequency of the rectangular wave, it becomes possible for the respective resonant-type electrodes to carry out modulation in accordance with necessary frequency components when the rectangular wave is expanded in the Fourier series, and it becomes possible to more accurately replicate the optical modulation operation that corresponds to the control signal of the rectangular wave.

Meanwhile, the "approximately an odd harmonic" in the invention means that, when a rectangular wave is replicated, frequencies slightly deviated from an odd number times are permitted within a scope in which no practical obstacle is caused.

When the proportions of the optical modulation depths of the respective frequency components are appropriately adjusted in accordance with the characteristics, such as the frequency component of the control signal wave form or the wavelength filter of an optical propagation path, influences dependent on the dispersion of optical paths, the frequency response of an optical signal receiving system, and the like, favorable transmission characteristics can be obtained. Specifically, in a case in which the transmission band of the optical filter on the optical fiber path is narrow, and high frequency components of an optical spectrum are attenuated, favorable transmission results can be obtained by increasing the modulation depths of the high frequency components in the optical control element of the invention.

In addition, even when the operation band of the photo detector or amplifier of the light-receiving system is narrow, and the high frequency components are significantly deteriorated, similarly, favorable transmission results can be obtained by increasing the modulation depths of the high frequency components in the optical control element.

The disposition order in a case in which a plurality of resonant-type electrodes is disposed in a series (cascaded) along the optical waveguide as shown in FIG. 2 will be described. The disposition order is, in principle, not limited; however, since the control signals are attenuated at the branched circuit or wiring section, it is desirable to dispose the resonant-type electrode that carries out modulation of a frequency that is deeply modulated at a location close to the light input section from the viewpoint of power consumption reduction. In addition, it is not necessary to arrange the order of the control signal branching and the order of the control signal operation on the light that propagates through the optical waveguide.

Figure 4:
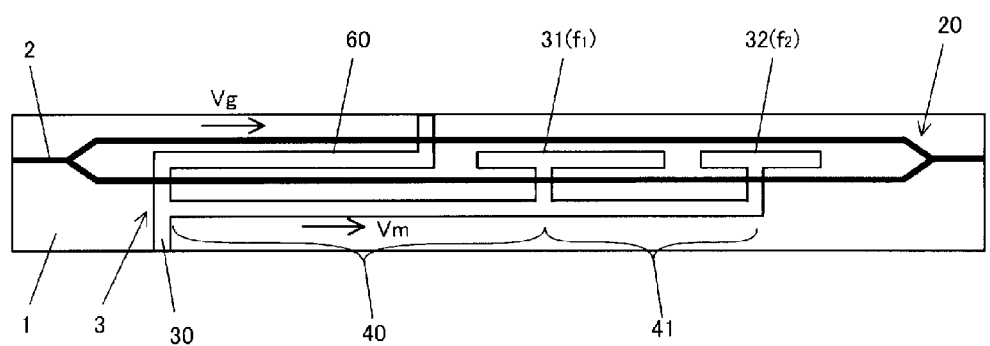
FIG. 4 is a view explaining a third example according to the optical control element of the invention.

Next, as shown in FIG. 4, the optical control element of the invention can be configured to have the control electrode 3 include the traveling wave-type electrode 60, and to supply the control signals branched from the feeder electrode 30 to the traveling wave-type electrode. Particularly, as shown in FIG. 4, it becomes possible to provide an optical control element having better functionality by including optical modulation by the resonant-type electrodes (31 and 32) and optical modulation by the traveling wave-type electrode 60 in a mixed state. For example, for the frequencies (f1 and f2) for which a sufficient modulation depth cannot be obtained with the traveling wave-type electrode, it becomes possible to modulate the frequencies using the resonant-type electrodes (31 and 32), and extend the modulation band. Needless to say, the electric delay lines (40 and 41) are provided between the traveling wave-type electrode and the respective resonant-type electrodes.

Figure 5:
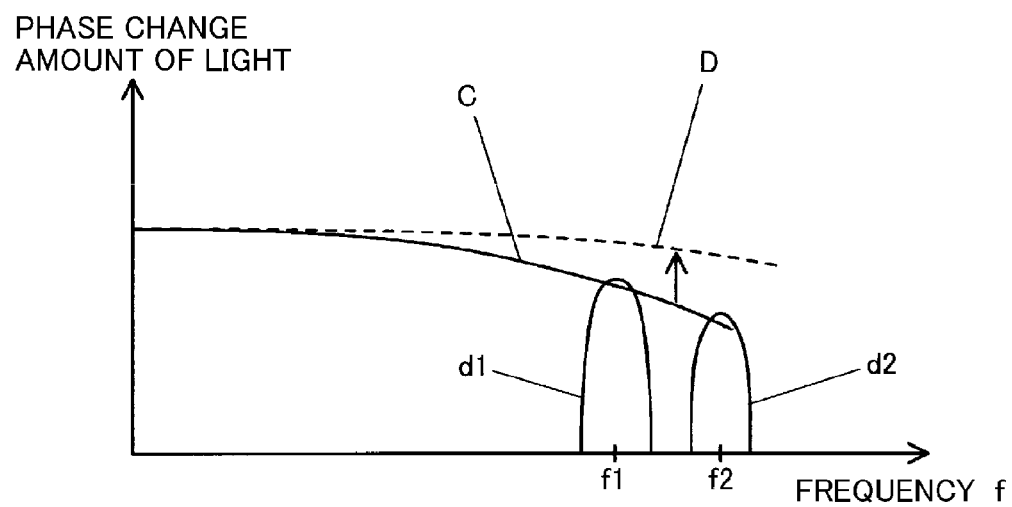
FIG. 5 is a view explaining a modulation state in the third example.

FIG. 5 is a graph showing an extended feature of the modulation band, and the graph C shows the modulation characteristics by the traveling wave-type electrode. It becomes possible to realize the entire modulation characteristics in a broadband as shown in the graph D by adding the modulation characteristics (d1 and d2) with the resonant-type electrodes (31 and 32) to the characteristics of the graph C.

As the control electrode that is used in the optical control element of the invention, it is possible to embed not only the traveling wave-type electrode as shown above but also an electrode for optical modulation of low frequency components including a DC component for the bias application.

Figure 6:
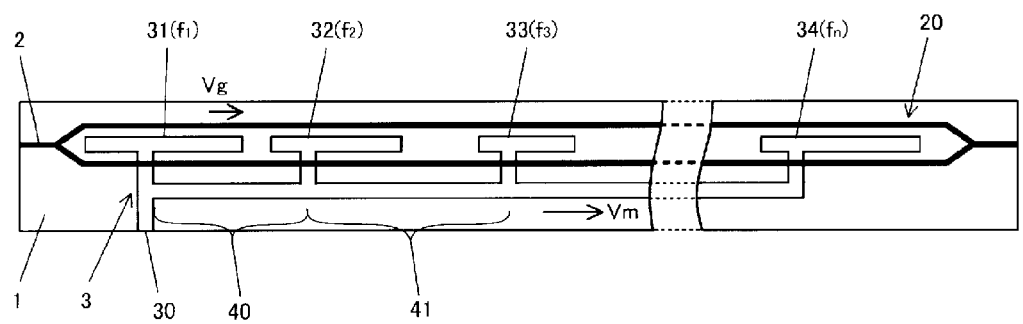
FIG. 6 is a view explaining a fourth example according to the optical control element of the invention.

The optical waveguide that is used in the optical control element of the invention is not limited to the optical waveguide in which a single-line optical waveguide 2 is used as shown in FIGS. 1 and 2, and it is also possible to use a Mach-Zehnder-type optical waveguide 20 as shown in FIGS. 4 and 6. It is needless to say that application to integrated structures in which a plurality of Mach-Zehnder-type optical waveguides is integrated is also possible.

In addition, it is also possible to use a curved optical waveguide and an optical waveguide folded back by reflection or the like. In a case in which the resonant-type electrodes are cascaded along the above optical waveguide, it is indispensable to configure the resonant-type electrodes and the optical waveguide so as to match the timings of light and the control signals at all times.

In a case a substrate of an electro-optic material whose orientation is almost vertical to the main polarization axis, such as a Z cut-type substrate of lithium niobate, is used as the substrate 1, and a branch circuit in which the branched control signal becomes a reverse phase is used at the branching section of the control signal, electrodes driven by normal phase control signals (a combination of a plurality of resonant-type electrodes) are disposed at one branched waveguide of the Mach-Zehnder-type optical waveguide, and electrodes driven by control signals branched into a reverse phase (similarly, a combination of a plurality of resonant-type electrodes) are disposed at the other branched waveguide. The above configuration enables push-pull driving, and it also becomes possible to further reduce the driving voltage. In addition, in a case in which the control signal is branched so as to be the same phase, the similar effect can be obtained by reversing the main polarization axis of the substrate in which one branched waveguide is formed.

With regard to the number of the resonant-type electrodes, a single resonant-type electrode is matched to each resonant frequency in the optical control element as described above. For example, in a case in which optical modulation that corresponds to a rectangular wave is carried out using five cascaded resonant-type electrodes, the lengths of the five resonant-type electrodes are set to the fundamental frequency $f_1$ and odd harmonic of the fundamental frequency ($f_2$: three times, $f_3$: five times, $f_4$: seven times, and $f_5$: nine times). Here, the size of the optical control element is increased in order to have as many resonant-type electrodes as the number of necessary resonant frequencies, and, therefore, hereinafter a plurality of resonance frequencies that can be modulated using a resonant-type electrode will be described.

Figure 7:
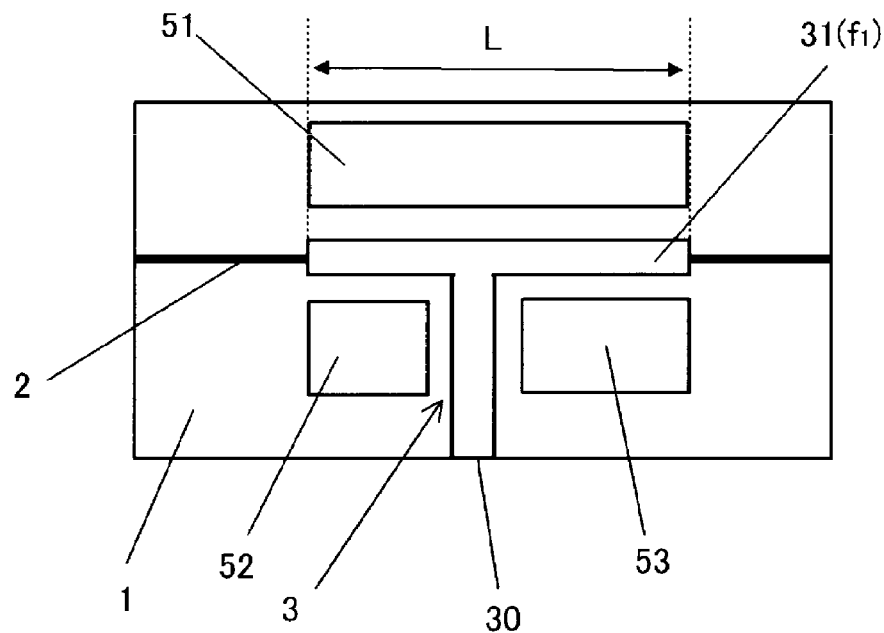
FIG. 7 is a view showing a resonant-type electrode with both ends open.

FIG. 7 shows a case in which both ends of the resonant-type electrode 31 are electrically open ended. The relationship between the electrode length L of the resonant-type electrode and the wavelength $\lambda_m$ of the microwaves on the electrode is expressed as follows using a natural number n. Reference numbers 51 to 53 in FIG. 7 indicate ground electrodes.

$$L=\lambda_m \times (2n-1)/2 \tag{1}$$

The wavelength $\lambda_m$ on the resonant-type electrode has a relationship of $v_m = f_m \times \lambda_m$, where the velocity of the microwaves is $v_m$, and the frequency is $f_m$. In addition, the velocity of the microwaves $v_m$ has a relationship of $v_m = c_0/n_m$ ($= f_m \times \lambda_m$), where, the refractive index of the microwaves on the electrode is $n_m$, and the velocity of light in a vacuum is $c_0$. Therefore, the formula (1) can be converted as follows:

$$L=c_0/(n_m \cdot f_m) \times (2n-1)/2 \tag{2}$$

Furthermore, the formula can be changed as follows for the frequency $f_m$.

$$f_m = c_0/(2 \cdot n_m \cdot L) \times (2n-1) = f_1 \times (2n-1) \tag{3}$$

Here, $f_1$ is equal to ($c_0/(2 \cdot n_m \cdot L)$), and refers to the fundamental frequency.

That is, it is easily understood that, in a single electrode length L, not only the resonance wave form of the fundamental frequency of f1 ($=c_0/(2 \cdot n_m \cdot L)$) but also resonance wave forms of resonance frequencies that are odd harmonics of the fundamental frequency $f_1$ can be formed at the same time.

Figure 8:
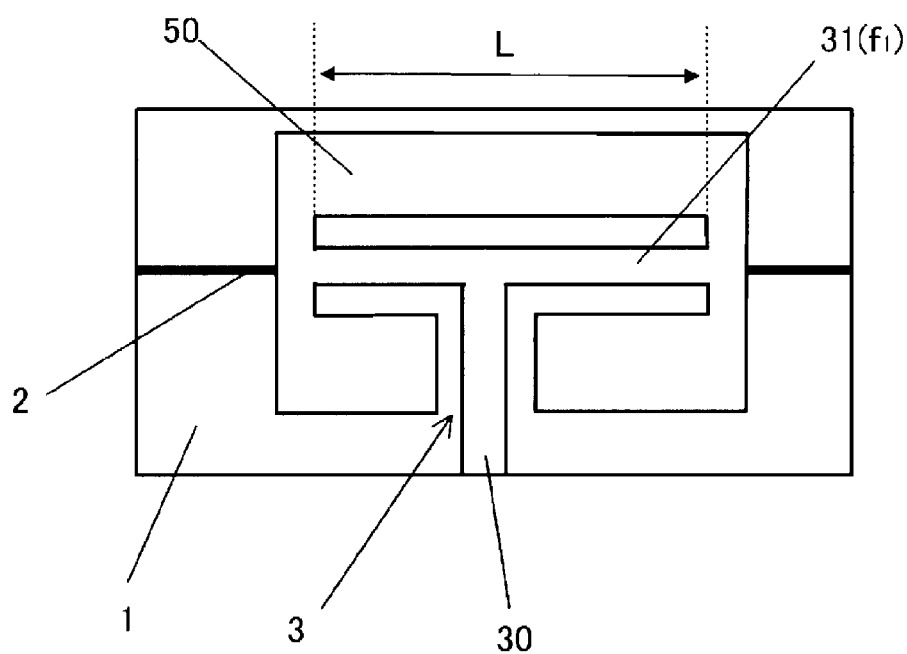
FIG. 8 is a view showing a resonant-type electrode with both ends short circuited.

Next, FIG. 8 shows a case in which both ends of the resonant-type electrode 31 are electrically short ended. The relationship between the electrode length L of the resonant-type electrode and the wavelength $\lambda_m$ of the microwaves on the electrode is expressed as follows using a natural number n. Reference number 50 in FIG. 8 indicates a ground electrode.

$$L=\lambda_m \times n \tag{4}$$

Similarly to the formulae (2) and (3), the formula (1) can be converted as shown in the formulae (5) and (6) using the relational expression of the velocity of the microwaves $v_m = c_0/n_m$ ($= f_m \times \lambda_m$):

$$L=c_0/(n_m \cdot f_m) \times n \tag{5}$$

Furthermore, the formula can be changed as follows for the frequency $f_m$.

$$f_m = c_0/(n_m \cdot L) \times n = f_1 \times n \quad (6)$$

Here, $f_1$ is equal to $(c_0/(n_m \cdot L))$, and refers to the fundamental frequency.

That is, it is easily understood that, in a single electrode length L, not only the resonance wave form of the fundamental frequency of f1 $(=c_0/(n_m \cdot L))$ but also resonance wave forms of resonance frequencies that are a natural number times the fundamental frequency $f_1$ can be formed at the same time.

Since the refractive index $n_m$ of the microwaves is dependent on the frequency, although the dependency is slight, frequencies that can be resonated using the same electrode are not exact odd multiple number or strict natural number times of the fundamental frequency, but it is possible to resonate the fundamental frequency $f_1$ and a resonant frequency that are odd harmonics or natural number harmonics of the fundamental frequency at the same time using a single resonant-type electrode. Therefore, it becomes possible to resonate a plurality of resonance frequencies that are an odd number or natural number times the fundamental frequency using a single resonant-type electrode, and it becomes possible to reduce the number of the resonant-type electrodes.

Meanwhile, the modulation depths of the respective resonant frequency components are preferably set to ⅓ (in the case of $f_2=3f_1$), ⅕ (in the case of $f_3=5f_1$), ⅐ (in the case of $f_4=7f_1$), and ⅑ (in the case of $f_5=9f_1$) of the modulation depth of the fundamental frequency $f_1$ respectively in accordance with the amounts of the respective frequency components when a perfect rectangular wave form is expanded in the Fourier series. This can be achieved by dividing the signal lines for each frequency component in advance, wiring and feeding a location that is appropriate to excite each frequency in accordance with the phase and intensity for each frequency component, or feeding locations at which the respective feeding efficiencies become a possible ideal distribution ratio.

Next, a case in which the resonant frequency is set to be a specific frequency f and frequencies f±Δf that are different by a predetermined amount Δf from the specific frequency will be described. In this case, since there are three resonance frequencies, the modulation frequency characteristics are expected to show, ideally, three peaks. However, control signals having frequencies (f, f±Δf) are applied not only to specific resonant-type electrodes that resonate at the frequencies but also to other resonant-type electrodes at the same time, and therefore, consequently, it is possible to obtain modulation frequency characteristics having a single-peak shape in which the peak appears at the specific frequency f, and the predetermined amount Δf is approximately the full width at half maximum.

In this case, the "approximately the full width at half maximum" means that a peak waveform has an extent based on the predetermined amount Δf, such as the "full width at half maximum" of a peak waveform.

As the control signals that are input to an optical control element having the above resonant-type electrodes, control signals having a single frequency or a plurality of different frequencies are used. Needless to say, it is preferable to use control signals having the specific frequency f or the frequencies f±Δf that are different by the predetermined amount Δf from the specific frequency in accordance with the resonant frequency when modulation efficiency is taken into account. However, in a case in which the modulation frequency characteristics have a single peak as described above, it is possible to obtain relatively high modulation efficiency by selecting not only the specific frequency f but also an arbitrary frequency in, for example, a range of approximately f±Δf.

An optical control element was experimentally manufactured under the following conditions, and the modulation frequency characteristics were measured.

In a configuration in which three resonant electrodes were tandemly arrayed with respect to a single optical waveguide, the lengths of the respective resonant electrodes were set to have a resonant frequency f=20.0 GHz and Δf=1.5 GHz.

The substrates were made of 1 mm-thick z-cut $LiNbO_3$, the buffer layers were made of 0.2 µm-thick $SiO_2$, the electrodes had a coplanar structure, and were made of 3 µm-thick aluminum (Al). The width of a signal electrode was set to 20 µm, and the gap between the signal electrode and a GND electrode was set to 20 µm. The lengths of the resonant electrodes with respect to the resonant frequency were set to 2.01 mm (18.5 GHz), 1.87 mm (20.0 GHz), and 1.71 mm (21.5 GHz) respectively.

Figure 9:
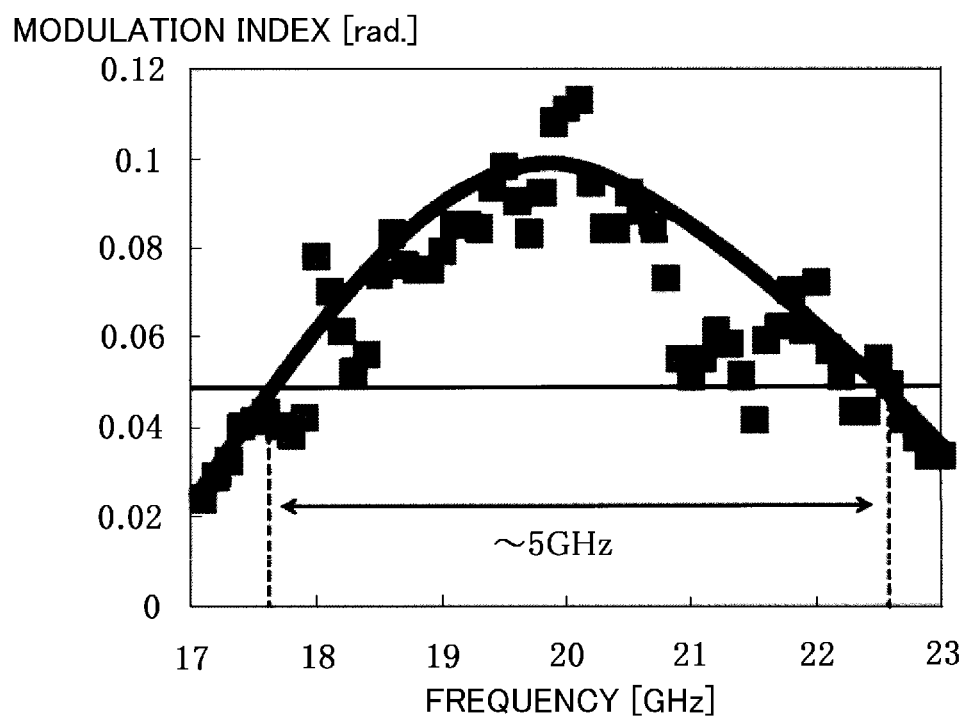
FIG. 9 is a graph showing modulation frequency characteristics in a case in which the resonant frequency of a resonant-type electrode is set to f=20.0 GHz and Δf=1.5 GHz.

The optical waveguide was formed by Ti diffusion, and the device size of the optical control element was set to 6.35 mm in the length and 2.75 mm in the width. The modulation characteristics of the manufactured optical control element were evaluated using an optical spectrum analyzer. The results are shown in FIG. 9. It is evident from the results that the central frequency became 20 GHz as designed, and the 3 dB bandwidth was also 5 GHz that almost matched 5.3 GHz which was the designed value.

In FIG. 9 showing the frequency characteristics of the modulation index, rectangular points indicate measured values, the solid line indicates an approximate line, and, on the whole, an approximately single-peak shape is formed. This is because the frequency of the control signal is also supplied to the resonant-type electrodes which do not have the resonant frequency at the same time as described above, but it becomes possible to obtain modulation frequency characteristics having three peaks, which are calculated values, by, for example, providing transmission filters or the like having a frequency that resonates at the resonant-type electrodes in routes connected to the respective resonant-type electrodes.

INDUSTRIAL APPLICABILITY

As described above, according to the invention, it is possible to provide an optical control element in which a plurality of resonant-type electrodes having different resonance frequencies are used, the modulation efficiency is high, and the costs can be decreased.

DESCRIPTION OF REFERENCE NUMERALS AND SIGNS

1 SUBSTRATE HAVING ELECTRO-OPTIC EFFECT
2, 20 OPTICAL WAVEGUIDE
3 CONTROL ELECTRODE
30 FEEDER ELECTRODE
31 TO 34 SIGNAL ELECTRODES (RESONANT-TYPE ELECTRODES)
40 TO 42 ELECTRIC DELAY LINES
60 TRAVELING WAVE-TYPE ELECTRODE

The invention claimed is:
1. An optical control element comprising:
a substrate having an electro-optic effect;
an optical waveguide formed on the substrate; and
a control electrode that is provided on the substrate and controls phase of light that propagates through the optical waveguide, wherein the control electrode has a plurality of resonant-type electrodes that are disposed along the optical waveguide and have different resonant frequencies, a feeder electrode through which control signals are input and branched signal electrodes that are branched from the feeder electrode are connected to the respective resonant-type electrodes, and the branched signal electrode is configured to match a timing at which the electric control signal is applied to each of the resonant-type electrodes and a timing at which the light that propagates through the optical waveguide passes at the section of each of the resonant-type electrodes.

2. The optical control element according to claim 1,
wherein the control signal is a rectangular wave, and the resonant frequency is set to an approximately odd harmonic of a fundamental frequency of the rectangular wave.

3. The optical control element according to claim 2,
wherein the resonant-type electrodes disposed along the optical waveguide are disposed in a light propagation direction in the order of magnitudes of modulation depths by the respective resonant-type electrodes with respect to the light that propagates through the optical waveguide.

4. The optical control element according to claim 2,
wherein the control electrode has a traveling wave-type electrode, and the traveling wave-type electrode is applied with the control signals branched from the feeder electrode.

5. The optical control element according to claim 2,
wherein the optical waveguide on which the control electrode is placed is a straight optical waveguide or Mach-Zehnder-type optical waveguide.

6. The optical control element according to claim 1,
wherein the resonant frequencies are set to become a specific frequency f and frequencies f±Δf that are different by a predetermined amount Δf from the specific frequency f, and control signals having a single frequency or a plurality of different frequencies are used as the control signal.

7. The optical control element according to claim 6,
wherein the resonant-type electrodes disposed along the optical waveguide are disposed in a light propagation direction in the order of magnitudes of modulation depths by the respective resonant-type electrodes with respect to the light that propagates through the optical waveguide.

8. The optical control element according to claim 6,
wherein the control electrode has a traveling wave-type electrode, and the traveling wave-type electrode is applied with the control signals branched from the feeder electrode.

9. The optical control element according to claim 6,
wherein the optical waveguide on which the control electrode is placed is a straight optical waveguide or Mach-Zehnder-type optical waveguide.

10. The optical control element according to claim 1,
wherein the resonant-type electrodes disposed along the optical waveguide are disposed in a light propagation direction in the order of magnitudes of modulation depths by the respective resonant-type electrodes with respect to the light that propagates through the optical waveguide.

11. The optical control element according to claim 10,
wherein the control electrode has a traveling wave-type electrode, and the traveling wave-type electrode is applied with the control signals branched from the feeder electrode.

12. The optical control element according to claim 10,
wherein the optical waveguide on which the control electrode is placed is a straight optical waveguide or Mach-Zehnder-type optical waveguide.

13. The optical control element according to claim 1,
wherein the control electrode has a traveling wave-type electrode, and the traveling wave-type electrode is applied with the control signals branched from the feeder electrode.

14. The optical control element according to claim 13,
wherein the optical waveguide on which the control electrode is placed is a straight optical waveguide or Mach-Zehnder-type optical waveguide.

15. The optical control element according to claim 1,
wherein the optical waveguide on which the control electrode is placed is a straight optical waveguide or Mach-Zehnder-type optical waveguide.

* * * * *